US011609822B2

(12) United States Patent
Tan

(10) Patent No.: US 11,609,822 B2
(45) Date of Patent: Mar. 21, 2023

(54) DATA STORING METHOD, MEMORY CONTROL CIRCUIT UNIT AND MEMORY STORAGE DEVICE

(71) Applicant: PHISON ELECTRONICS CORP., Miaoli (TW)

(72) Inventor: Kok-Yong Tan, Miaoli County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 20 days.

(21) Appl. No.: 17/337,428

(22) Filed: Jun. 3, 2021

(65) Prior Publication Data
US 2022/0342765 A1 Oct. 27, 2022

(30) Foreign Application Priority Data
Apr. 22, 2021 (TW) ................. 110114441

(51) Int. Cl.
| | | |
|---|---|---|
| G06F 11/07 | (2006.01) | |
| G06F 11/14 | (2006.01) | |
| G06F 1/30 | (2006.01) | |
| G06F 12/02 | (2006.01) | |
| G06F 11/30 | (2006.01) | |

(52) U.S. Cl.
CPC ............ *G06F 11/1441* (2013.01); *G06F 1/30* (2013.01); *G06F 11/0757* (2013.01); *G06F 11/3037* (2013.01); *G06F 12/0246* (2013.01); G06F 2212/7201 (2013.01)

(58) Field of Classification Search
CPC .... G06F 11/1441; G06F 1/30; G06F 11/0757; G06F 11/3037; G06F 12/0246; G06F 2212/7201
See application file for complete search history.

(56) References Cited

U.S. PATENT DOCUMENTS

| | | | | |
|---|---|---|---|---|
| 10,242,734 | B1* | 3/2019 | Khakifirooz | ....... G11C 16/3418 |
| 2020/0341676 | A1* | 10/2020 | Yang | ..................... G06F 3/0673 |
| 2022/0129055 | A1* | 4/2022 | Yang | ..................... G06F 3/0679 |
| 2022/0214817 | A1* | 7/2022 | Ha | ......................... G06F 3/0679 |

FOREIGN PATENT DOCUMENTS

TW         I725416         4/2021

OTHER PUBLICATIONS

"Office Action of Taiwan Counterpart Application", dated Feb. 25, 2022, p. 1-p. 6.

* cited by examiner

*Primary Examiner* — Matthew M Kim
*Assistant Examiner* — Kyle Emanuele
(74) *Attorney, Agent, or Firm* — JCIPRNET

(57) ABSTRACT

A data storing method, a memory control circuit unit and a memory storage device are provided. The method includes the following. When the memory storage device is powered-on, it is determined whether a power loss state of the memory storage device matches an unexpected power loss state according to a power-off instruction. Data is written into a plurality of physical programming units using a single-page programming mode and not using a multi-page programming mode when it is determined that the power loss state matches the unexpected power loss state.

18 Claims, 7 Drawing Sheets

| Lower physical programming unit | Middle physical programming unit | Upper physical programming unit |
|---|---|---|
| 0 | 1 | 2 |
| 3 | 4 | 5 |
| 6 | 7 | 8 |
| 9 | 10 | 11 |
| 12 | 13 | 14 |
| ⋮ | ⋮ | ⋮ |
| 255 | 256 | 257 |

DATA STORING METHOD, MEMORY CONTROL CIRCUIT UNIT AND MEMORY STORAGE DEVICE

CROSS-REFERENCE TO RELATED APPLICATION

This application claims the priority benefit of Taiwanese application no. 110114441, filed on Apr. 22, 2021. The entirety of the above-mentioned patent application is hereby incorporated by reference herein and made a part of this specification.

BACKGROUND

Technical Field

The disclosure relates to a data storage technology; in particular, the disclosure relates to a data storing method, a memory control circuit unit and a memory storage device.

Description of Related Art

Digital cameras, mobile phones and portable media players have grown rapidly in the past few years, which has led to a rapid increase in consumer demand for storage media. Since a rewritable non-volatile memory module (e.g., flash memory) has properties of non-volatile data, power saving, small size, non-mechanical structure, and fast reading and writing speed, it is well suitable for portable electronic products, such as notebook computers. A solid state drive, for example, is a memory storage device in which flash memory serves as a storage medium.

Therefore, the flash memory industry has become a very popular part of the electronics industry in recent years.

Generally speaking, the rewritable non-volatile memory includes a plurality of physical erasing units, and each of the physical erasing units may be formed by a plurality of physical programming units. Before producing a memory storage device having rewritable non-volatile memory, a manufacturer of the memory storage device (or a supplier of the rewritable non-volatile memory) needs to perform a power-off test on the rewritable non-volatile memory to ensure that power-off protection functions. During the test, it is required to repeatedly perform programming or erasing operations on the rewritable non-volatile memory. Currently, storage space in the rewritable non-volatile memory (e.g., a 3D NAND flash memory) is increasing, and more and more data may be stored in one physical programming unit included in the physical erasing unit. Therefore, the test may take a long time if programming or erasing operations are repeatedly performed on the rewritable non-volatile memory during the test.

SUMMARY

The disclosure provides a data storing method, a memory control circuit unit, and a memory storage device, in which recovery time from an unexpected power loss is reduced and operating efficiency of the memory storage device is increased.

The disclosure provides a data storing method for a memory storage device including a rewritable non-volatile memory module. The rewritable non-volatile memory module includes a plurality of physical erasing units. Each of the physical erasing units has a plurality of physical programming units. The physical programming units are mapped to a plurality of logical addresses. The data storing method includes the following. It is determined whether a power loss state of the memory storage device matches an unexpected power loss state according to a power-off instruction when the memory storage device is powered-on. In addition, data is written into the physical programming units using a single-page programming mode and not using a multi-page programming mode when it is determined that the power loss state matches the unexpected power loss state.

In an embodiment of the disclosure, the step of determining whether the power loss state of the memory storage device matches the unexpected power loss state according to the power-off instruction includes the following. It is determined whether a normal power loss or an unexpected power loss occurs during a power loss according to the power-off instruction, and occurrence of the normal power loss or occurrence of the unexpected power loss is recorded to generate power loss information. It is determined that the unexpected power loss occurs during the power loss if the power-off instruction is not detected during powering-on after the power loss, and it is determined that the normal power loss occurs during the power loss if the power-off instruction is detected during powering-on after the power loss. In addition, it is determined whether the power loss state matches the unexpected power loss state according to the power loss information.

In an embodiment of the disclosure, the step of determining whether the power loss state of the memory storage device matches the unexpected power loss state according to the power loss information includes the following. It is determined that the power loss state matches the unexpected power loss state if a count of consecutive occurrences of the unexpected power loss during a predetermined time period is greater than a first threshold value.

In an embodiment of the disclosure, the step of determining whether the power loss state of the memory storage device matches the unexpected power loss state according to the power loss information includes the following. It is determined that the power loss state matches the unexpected power loss state if a ratio of a count of occurrences of the unexpected power loss to a count of occurrences of the power loss is greater than a second threshold value.

In an embodiment of the disclosure, the step of determining whether the power loss state of the memory storage device matches the unexpected power loss state according to the power loss information includes the following. It is determined that the power loss state matches the unexpected power loss state if the unexpected power loss consecutively occurs a predetermined number of times and an interval time between two consecutive occurrences of the unexpected power loss is less than a third threshold value.

In an embodiment of the disclosure, the step of writing the data into the physical programming units using the single-page programming mode and not using the multi-page programming mode when it is determined that the power loss state matches the unexpected power loss state includes the following. It is determined whether the power-off instruction was detected during a previous power loss. In addition, it is determined that an unexpected power loss has occurred during the previous power loss and a sudden power-off recovery operation is performed if the power-off instruction is not detected. The sudden power-off recovery operation includes the following. First data stored in a first physical erasing unit is copied into a second physical erasing unit using the single-page programming mode, in which the first physical erasing unit is the physical erasing unit last written before the unexpected power loss occurs. Moreover mapping information between a logical address corresponding to the first data and the physical programming unit included in the second physical erasing unit is updated in a logical-to-physical mapping table.

In an embodiment of the disclosure, the step of writing the data into the physical programming units using the single-page programming mode and not using the multi-page programming mode includes the following. A first instruction is received from a host system. In addition, data corresponding to the first instruction is written into the physical programming units using the single-page programming mode.

The disclosure provides a memory control circuit unit for controlling a memory storage device. The memory storage device includes a rewritable non-volatile memory module. The memory control circuit unit includes a host interface, a memory interface, and a memory management circuit. The host interface is configured to be coupled to a host system. The memory interface is configured to be coupled to the rewritable non-volatile memory module. The rewritable non-volatile memory module includes a plurality of physical erasing units. Each of the physical erasing units has a plurality of physical programming units. The physical programming units are mapped to a plurality of logical addresses. The memory management circuit is coupled to the host interface and the memory interface. The memory management circuit is configured to determine whether a power loss state of the memory storage device matches an unexpected power loss state according to a power-off instruction when the memory storage device is powered-on. In addition, the memory management circuit is also configured to write data into the physical programming units using a single-page programming mode and not using a multi-page programming mode when it is determined that the power loss state matches the unexpected power loss state.

In an embodiment of the disclosure, the operation of determining whether the power loss state of the memory storage device matches the unexpected power loss state according to the power-off instruction includes the following. It is determined whether a normal power loss or an unexpected power loss occurs during a power loss according to the power-off instruction, and occurrence of the normal power loss or occurrence of the unexpected power loss is recorded to generate power loss information. It is determined that the unexpected power loss occurs during the power loss if the power-off instruction is not detected during powering-on after the power loss, and it is determined that the normal power loss occurs during the power loss if the power-off instruction is detected during powering-on after the power loss. In addition, it is determined whether the power loss state matches the unexpected power loss state according to the power loss information.

In an embodiment of the disclosure, the operation of determining whether the power loss state of the memory storage device matches the unexpected power loss state according to the power loss information includes the following. It is determined that the power loss state matches the unexpected power loss state if a count of consecutive occurrences of the unexpected power loss during a predetermined time period is greater than a first threshold value.

In an embodiment of the disclosure, the operation of determining whether the power loss state of the memory storage device matches the unexpected power loss state according to the power loss information includes the following. It is determined that the power loss state matches the unexpected power loss state if a ratio of a count of occurrences of the unexpected power loss to a count of occurrences of the power loss is greater than a second threshold value.

In an embodiment of the disclosure, the operation of determining whether the power loss state of the memory storage device matches the unexpected power loss state according to the power loss information includes the following. It is determined that the power loss state matches the unexpected power loss state if the unexpected power loss consecutively occurs a predetermined number of times and an interval time between two consecutive occurrences of the unexpected power loss is less than a third threshold value.

In an embodiment of the disclosure, the operation of writing the data into the physical programming units using the single-page programming mode and not using the multi-page programming mode when it is determined that the power loss state matches the unexpected power loss state includes the following. It is determined whether the power-off instruction was detected during a previous power loss. In addition, it is determined that an unexpected power loss has occurred during the previous power loss and a sudden power-off recovery operation is performed if the power-off instruction is not detected. The sudden power-off recovery operation includes the following. First data stored in a first physical erasing unit is copied into a second physical erasing unit using the single-page programming mode, in which the first physical erasing unit is the physical erasing unit last written before the unexpected power loss occurs. Moreover mapping information between a logical address corresponding to the first data and the physical programming unit included in the second physical erasing unit is updated in a logical-to-physical mapping table.

In an embodiment of the disclosure, the operation of writing the data into the physical programming units using the single-page programming mode and not using the multi-page programming mode includes the following. A first instruction is received from a host system. In addition, data corresponding to the first instruction is written into the physical programming units using the single-page programming mode.

The disclosure provides a memory storage device. The memory storage device includes a connection interface unit, a rewritable non-volatile memory module, and a memory control circuit unit. The connection interface unit is configured to be coupled to a host system. The memory control circuit unit is coupled to the connection interface unit and the rewritable non-volatile memory module. The rewritable non-volatile memory module includes a plurality of physical erasing units. Each of the physical erasing units has a plurality of physical programming units. The physical programming units are mapped to a plurality of logical addresses. The memory control circuit unit is configured to determine whether a power loss state of the memory storage device matches an unexpected power loss state according to a power-off instruction when the memory storage device is powered-on. In addition, the memory control circuit unit is also configured to write data into the physical programming units using a single-page programming mode and not using a multi-page programming mode when it is determined that the power loss state matches the unexpected power loss state.

In an embodiment of the disclosure, the operation of determining whether the power loss state of the memory storage device matches the unexpected power loss state according to the power-off instruction includes the following. It is determined whether a normal power loss or an unexpected power loss occurs during a power loss according to the power-off instruction, and occurrence of the normal power loss or occurrence of the unexpected power loss is recorded to generate power loss information. It is determined that the unexpected power loss occurs during the power loss if the power-off instruction is not detected during powering-on after the power loss, and it is determined that the normal power loss occurs during the power loss if the power-off instruction is detected during powering-on after the power loss. In addition, it is determined whether the power loss state matches the unexpected power loss state according to the power loss information.

In an embodiment of the disclosure, the operation of determining whether the power loss state of the memory storage device matches the unexpected power loss state according to the power loss information includes the following. It is determined that the power loss state matches the unexpected power loss state if a count of consecutive occurrences of the unexpected power loss during a predetermined time period is greater than a first threshold value.

In an embodiment of the disclosure, the operation of determining whether the power loss state of the memory storage device matches the unexpected power loss state according to the power loss information includes the following. It is determined that the power loss state matches the unexpected power loss state if a ratio of a count of occurrences of the unexpected power loss to a count of occurrences of the power loss is greater than a second threshold value.

In an embodiment of the disclosure, the operation of determining whether the power loss state of the memory storage device matches the unexpected power loss state according to the power loss information includes the following. It is determined that the power loss state matches the unexpected power loss state if the unexpected power loss consecutively occurs a predetermined number of times and an interval time between two consecutive occurrences of the unexpected power loss is less than a third threshold value.

In an embodiment of the disclosure, the operation of writing the data into the physical programming units using the single-page programming mode and not using the multi-page programming mode when it is determined that the power loss state matches the unexpected power loss state includes the following. It is determined whether the power-off instruction was detected during a previous power loss. In addition, it is determined that an unexpected power loss has occurred during the previous power loss and a sudden power-off recovery operation is performed if the power-off instruction is not detected. The sudden power-off recovery operation includes the following. First data stored in a first physical erasing unit is copied into a second physical erasing unit using the single-page programming mode, in which the first physical erasing unit is the physical erasing unit last written before the unexpected power loss occurs. Moreover mapping information between a logical address corresponding to the first data and the physical programming unit included in the second physical erasing unit is updated in a logical-to-physical mapping table.

In an embodiment of the disclosure, the operation of writing the data into the physical programming units using the single-page programming mode and not using the multi-page programming mode includes the following. A first instruction is received from a host system. In addition, data corresponding to the first instruction is written into the physical programming units using the single-page programming mode.

Based on the foregoing, in the data storing method, the memory control circuit unit, and the memory storage device of the disclosure, when it is detected that the unexpected power loss state is matched, data may be written using the single-page programming mode. The recovery time from an unexpected power loss is reduced, and operating efficiency of the memory storage device is increased.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Generally speaking, a memory storage device (also referred to as a memory storage system) includes a rewritable non-volatile memory module and a controller (also referred to as a control circuit unit). Typically, the memory storage device may be used together with a host system for the host system to write data into the memory storage device or read data from the memory storage device.

Figure 1:
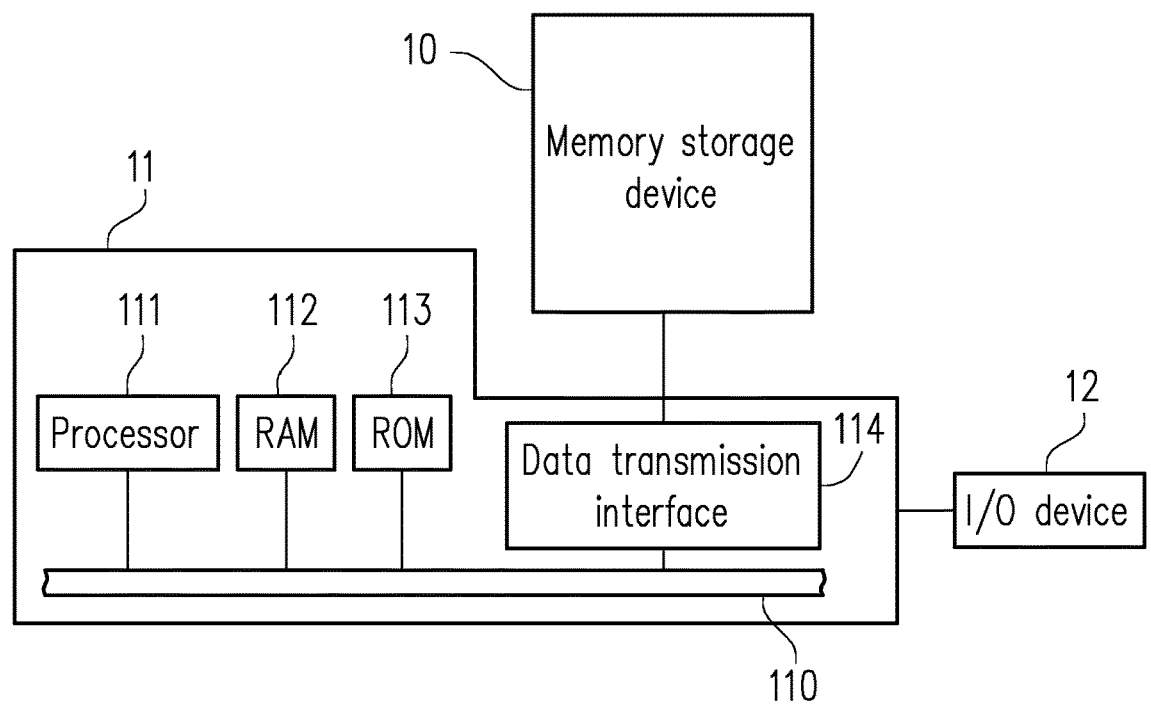
FIG. 1 is a schematic diagram of a host system, a memory storage device, and an input/output (I/O) device according to an exemplary embodiment of the disclosure.
Figure 2:
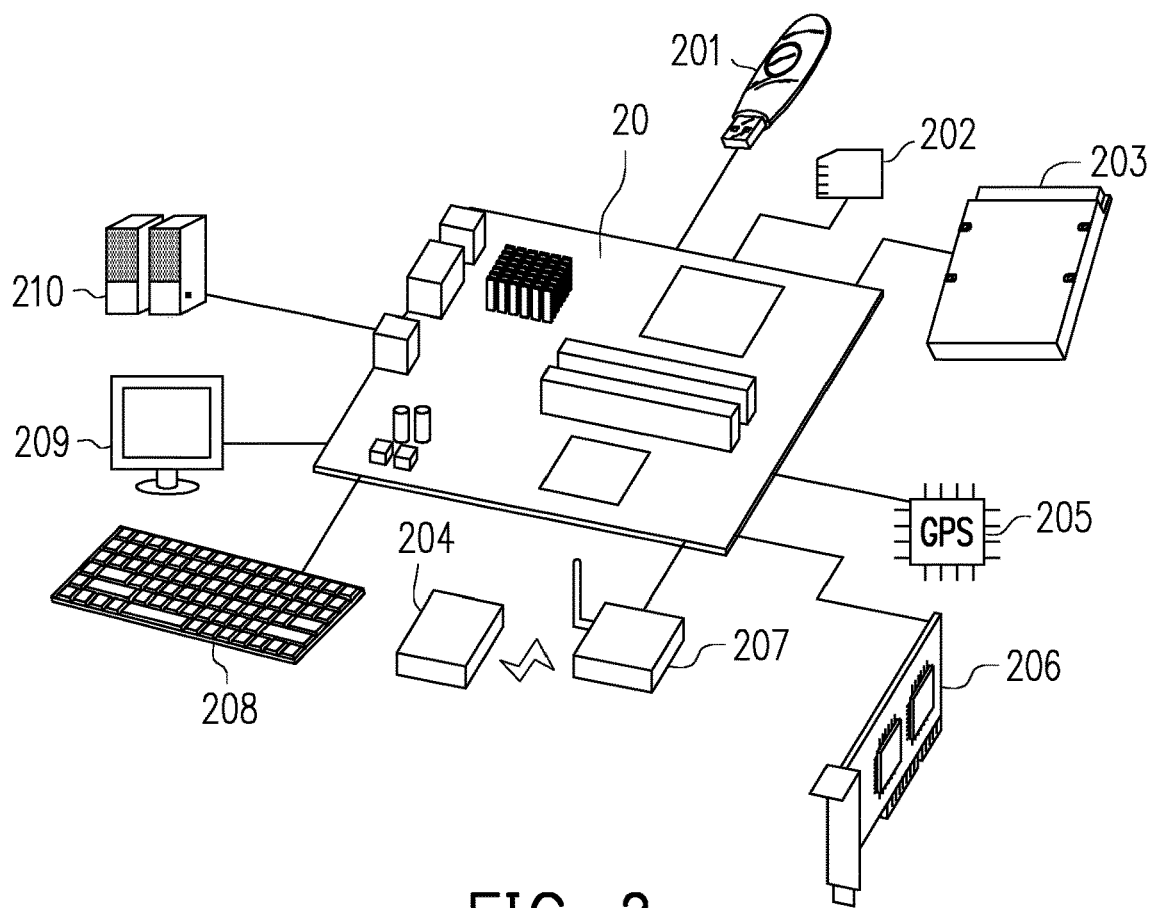
FIG. 2 is a schematic diagram of a host system, a memory storage device, and an input/output (I/O) device according to another exemplary embodiment of the disclosure.

FIG. 1 is a schematic diagram of a host system, a memory storage device, and an input/output (I/O) device according to an exemplary embodiment of the disclosure. FIG. 2 is a schematic diagram of a host system, a memory storage device, and an input/output (I/O) device according to another exemplary embodiment of the disclosure.

With reference to FIG. 1 and FIG. 2, a host system 11 generally includes a processor 111, random access memory (RAM) 112, read only memory (ROM) 113, and a data transmission interface 114. The processor 111, the random access memory 112, the read only memory 113, and the data transmission interface 114 are coupled to a system bus 110.

In this exemplary embodiment, the host system 11 may be coupled to a memory storage device 10 through the data transmission interface 114. For example, the host system 11 may store data into the memory storage device 10 or read data from the memory storage device 10 through the data transmission interface 114. In addition, the host system 11 may be coupled to an I/O device 12 through the system bus 110. For example, the host system 11 may transmit an output signal to the I/O device 12 or receive an input signal from the I/O device 12 through the system bus 110.

In this exemplary embodiment, the processor 111, the random access memory 112, the read only memory 113, and the data transmission interface 114 may be disposed on a motherboard 20 of the host system 11. The data transmission interface 114 may include one or more data transmission interfaces. Through the data transmission interface 114, the motherboard 20 may be coupled to the memory storage device 10 in a wired or wireless manner. The memory storage device 10 may be, for example, a flash drive 201, a memory card 202, a solid state drive (SSD) 203, or a wireless memory storage device 204. The wireless memory storage device 204 may be, for example, a near-field communication (NFC) memory storage device, a Wireless Fidelity (WiFi) memory storage device, a Bluetooth memory storage device, a Bluetooth Low Energy memory storage device (e.g., iBeacon), or any other memory storage device based on various modes of wireless communication technology. In addition, the motherboard 20 may also be coupled to various I/O devices such as a Global Positioning System (GPS) module 205, a network interface card 206, a wireless transmission device 207, a keyboard 208, a screen 209, or a speaker 210 through the system bus 110. For example, in an exemplary embodiment, the motherboard 20 may access the wireless memory storage device 204 through the wireless transmission device 207.

Figure 3:
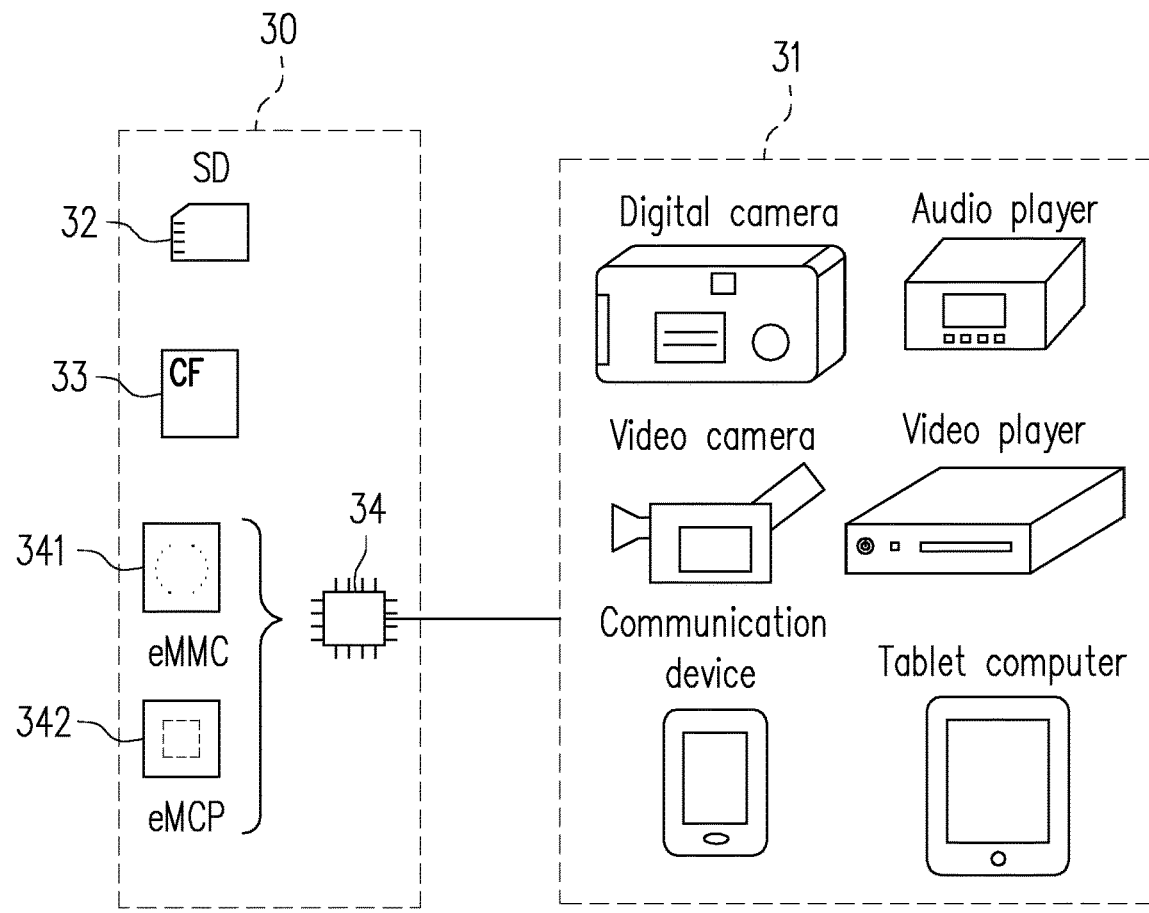
FIG. 3 is a schematic diagram of a host system and a memory storage device according to another exemplary embodiment of the disclosure.

In an exemplary embodiment, the host system may be any system that substantially works with a memory storage device to store data. In the above exemplary embodiment, a computer system is taken for describing the host system. However, FIG. 3 is a schematic diagram of a host system and a memory storage device according to another exemplary embodiment of the disclosure. With reference to FIG. 3, in another exemplary embodiment, a host system 31 may be a system such as a digital camera, a video camera, a communication device, an audio player, a video player, or a tablet computer, and a memory storage device 30 may be various non-volatile memory storage devices such as a Secure Digital (SD) card 32, a Compact Flash (CF) card 33, or an embedded storage device 34 used by the host system 31. The embedded storage device 34 includes embedded storage devices in various forms, such as an embedded Multi Media Card (eMMC) 341 and/or an embedded Multi Chip Package (eMCP) storage device 342, which directly couple the memory module to the substrate of the host system.

Figure 4:
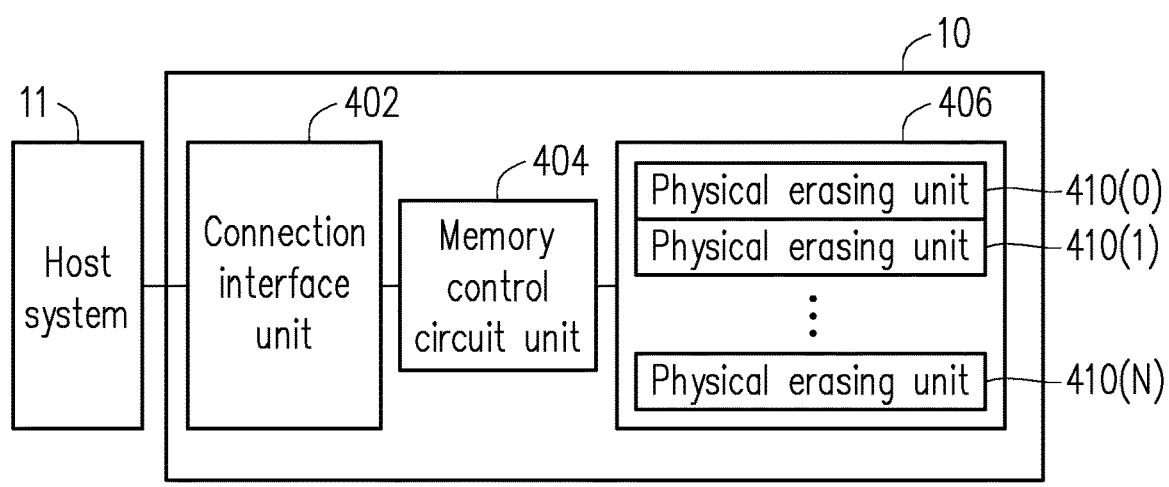
FIG. 4 is a schematic block diagram of a host system and a memory storage device according to an exemplary embodiment of the disclosure.

FIG. 4 is a schematic block diagram of a host system and a memory storage device according to an exemplary embodiment of the disclosure.

With reference to FIG. 4, the memory storage device 10 includes a connection interface unit 402, a memory control circuit unit 404, and a rewritable non-volatile memory module 406.

In this exemplary embodiment, the connection interface unit 402 is compatible with the Serial Advanced Technology Attachment (SATA) standard. However, it should be understood that the disclosure is not limited thereto. The connection interface unit 402 may also be compliant with the Parallel Advanced Technology Attachment (PATA) standard, Institute of Electrical and Electronic Engineers (IEEE) 1394 standard, Peripheral Component Interconnect Express (PCI Express) standard, Universal Serial Bus (USB) Standard, Ultra High Speed-I (UHS-I) interface standard, Ultra High Speed-II (UHS-II) interface standard, Secure Digital (SD) interface standard, Memory Stick (MS) interface standard, multi-chip package (MCP) interface standard, Multimedia Card (MMC) interface standard, embedded Multimedia Card (eMMC) interface standard, Universal Flash Storage (UFS) interface standard, embedded multi-chip package (eMCP) interface standard, Compact Flash (CF) interface standard, Integrated Device Electronics (IDE) standard or other suitable standards. In this exemplary embodiment, the connection interface unit 402 may be packaged into the same chip with the memory control circuit unit 404. Alternatively, the connection interface unit 402 may be arranged outside a chip including the memory control circuit unit 404.

The memory control circuit unit 404 is configured to execute a plurality of logic gates or control instructions implemented in a hardware form or firmware form and performs operations such as writing, reading, and erasing data in the rewritable non-volatile memory module 406 according to instructions of the host system 11.

The rewritable non-volatile memory module 406 is coupled to the memory control circuit unit 404 and configured to store data written by the host system 11. The rewritable non-volatile memory module 406 has physical erasing units 410(0) to 410(N). For example, the physical erasing units 410(0) to 410(N) may belong to the same memory die or different memory dies. Each physical erasing unit has a plurality of physical programming units, and the physical programming units belonging to the same physical erasing unit may be written independently and erased simultaneously. However, it should be understood that the disclosure is not limited thereto. Each physical erasing unit may be composed of 64 physical programming units, 256 physical programming units, or an arbitrary number of physical programming units.

To be more specific, the physical erasing units are the minimum unit for erasing. That is, each physical erasing unit includes the smallest number of memory cells to be erased together. The physical programming units are the minimum unit for programming. That is, the physical programming units are the minimum unit for data write. Each physical programming unit may include a data bit region and a redundancy bit region. The data bit region includes a plurality of physical access addresses configured to store user data, and the redundancy bit region is configured to store system data (e.g., control information and error correcting codes). In this exemplary embodiment, the data bit region of each physical programming unit contains 8 physical access addresses, and the size of one physical access address is 512 bytes. However, in other embodiments, the data bit region may also contain more or fewer physical access addresses, and the size and number of physical access addresses are not limited by the disclosure. For example, in an exemplary embodiment, the physical erasing unit is a physical block, and the physical programming unit is a physical page or a physical sector. Nonetheless, the disclosure is not limited thereto.

In this exemplary embodiment, the rewritable non-volatile memory module 406 may include a single-level cell (SLC) NAND-type flash memory module (i.e., a flash memory module that stores 1 bit in one memory cell), a multi-level cell (MLC) NAND-type flash memory module (i.e., a flash memory module that stores 2 bits in one memory cell), a triple-level cell (TLC) NAND-type flash memory module (i.e., a flash memory module that stores 3 bits in one memory cell), other flash memory modules, or other memory modules with the same properties.

Figures 5A, 5B:
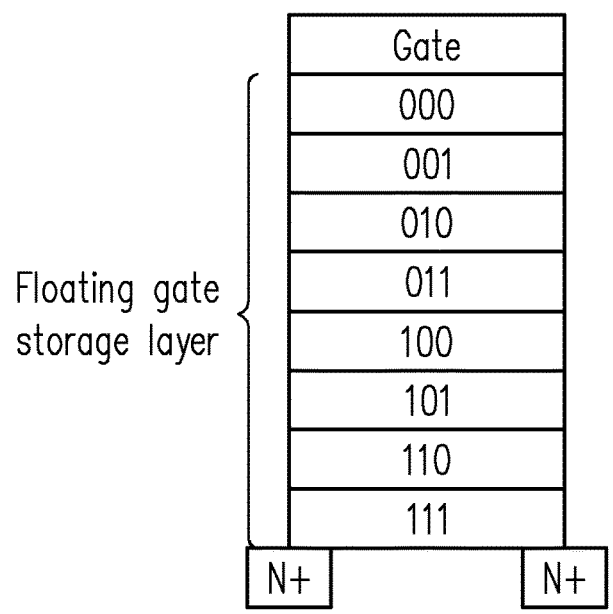
FIG. 5A and FIG. 5B are schematic diagrams of a memory cell storage architecture and physical erasing units according to an exemplary embodiment of the disclosure.

FIG. 5A and FIG. 5B are schematic diagrams of a memory cell storage architecture and physical erasing units according to an exemplary embodiment of the disclosure.

With reference to FIG. 5A, in the rewritable non-volatile memory module 406, a storage state of each memory cell may be identified as "111", "110", "101", "100", "011", "010", "001", or "000" (as shown in FIG. 5A). The first bit from the left is the least significant bit (LSB), the second bit from the left is the central significant bit (CSB), and the third bit from the left is the most significant bit (MSB). In addition, multiple memory cells arranged on the same word line may form three physical programming units. The physical programming unit composed of the LSBs of the memory cells is referred to as a lower physical programming unit, the physical programming unit composed of the CSBs of the memory cells is referred to as a middle physical programming unit, and the physical programming unit composed of the MSBs of the memory cells is referred to as an upper physical programming unit.

With reference to FIG. 5B, one physical erasing unit is composed of a plurality of physical programming unit groups. Each physical programming unit group includes the lower physical programming unit, the middle physical programming unit, and the upper physical programming unit composed of multiple memory cells arranged on the same word line. For example, in the physical erasing unit, the $0^{th}$ physical programming unit belonging to the lower physical programming unit, the $1^{st}$ physical programming unit belonging to the middle physical programming unit, and the $2^{nd}$ physical programming unit belonging to the upper physical programming unit are regarded as one physical programming unit group. Similarly, the $3^{rd}$, $4^{th}$, and $5^{th}$ physical programming units are regarded as one physical programming unit group. By analogy, the other physical programming units are also divided into a plurality of physical programming unit groups in this way. In other words, in the exemplary embodiment of FIG. 5B, the physical erasing unit has a total of 258 physical programming units. In addition, since the lower physical programming unit, the middle physical programming unit, and the upper physical programming unit composed of multiple memory cells arranged on the same word line form one physical programming unit group, the physical erasing unit of FIG. 5B may be divided into 86 physical programming unit groups in total. However, it should be noted that the disclosure is not intended to limit the number of physical programming units or physical programming unit groups in the physical erasing unit.

Figure 6:
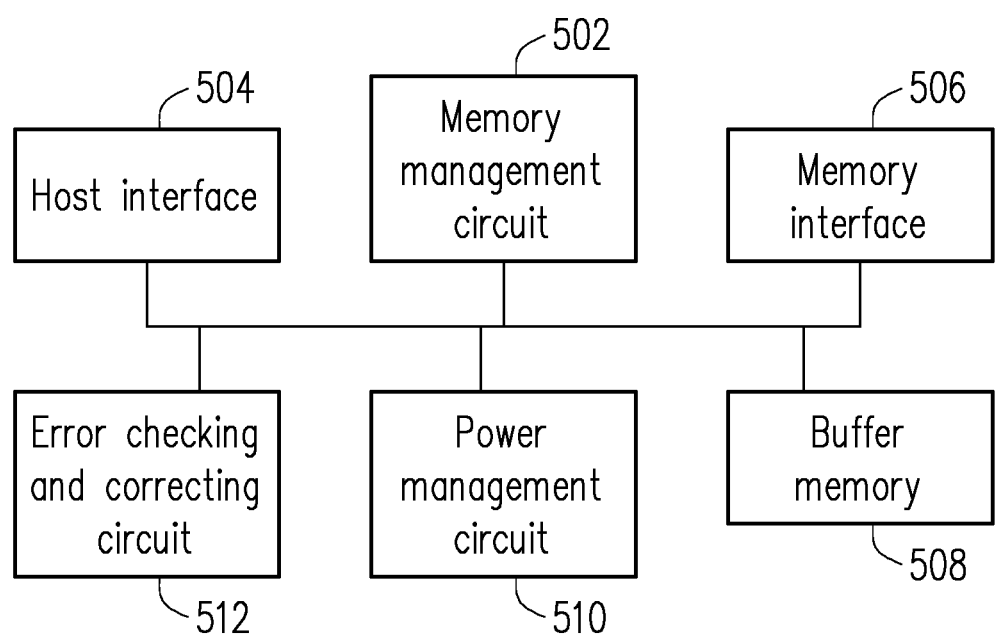
FIG. 6 is a schematic block diagram of a memory control circuit unit according to an exemplary embodiment of the disclosure.

FIG. 6 is a schematic block diagram of a memory control circuit unit according to an exemplary embodiment of the disclosure.

With reference to FIG. 6, the memory control circuit unit 404 includes a memory management circuit 502, a host interface 504, a memory interface 506, a buffer memory 508, a power management circuit 510, and an error checking and correcting circuit 512.

The memory management circuit 502 is configured to control the overall operation of the memory control circuit unit 404. Specifically, there exist a plurality of control instructions in the memory management circuit 502. During operation of the memory storage device 10, the control instructions are executed to perform operations such as writing, reading, and erasing data. Hereinafter, when the operation of the memory management circuit 502 is descried, the operation of the memory control circuit unit 404 is equivalently described.

In this exemplary embodiment, the control instructions of the memory management circuit 502 are implemented in a firmware form. For example, the memory management circuit 502 is provided with a microprocessor unit (not shown) and read only memory (not shown), and the control instructions are programmed into the read only memory. During operation of the memory storage device 10, the control instructions are executed by the microprocessor unit to perform operations such as writing, reading, and erasing data.

Figure 7:
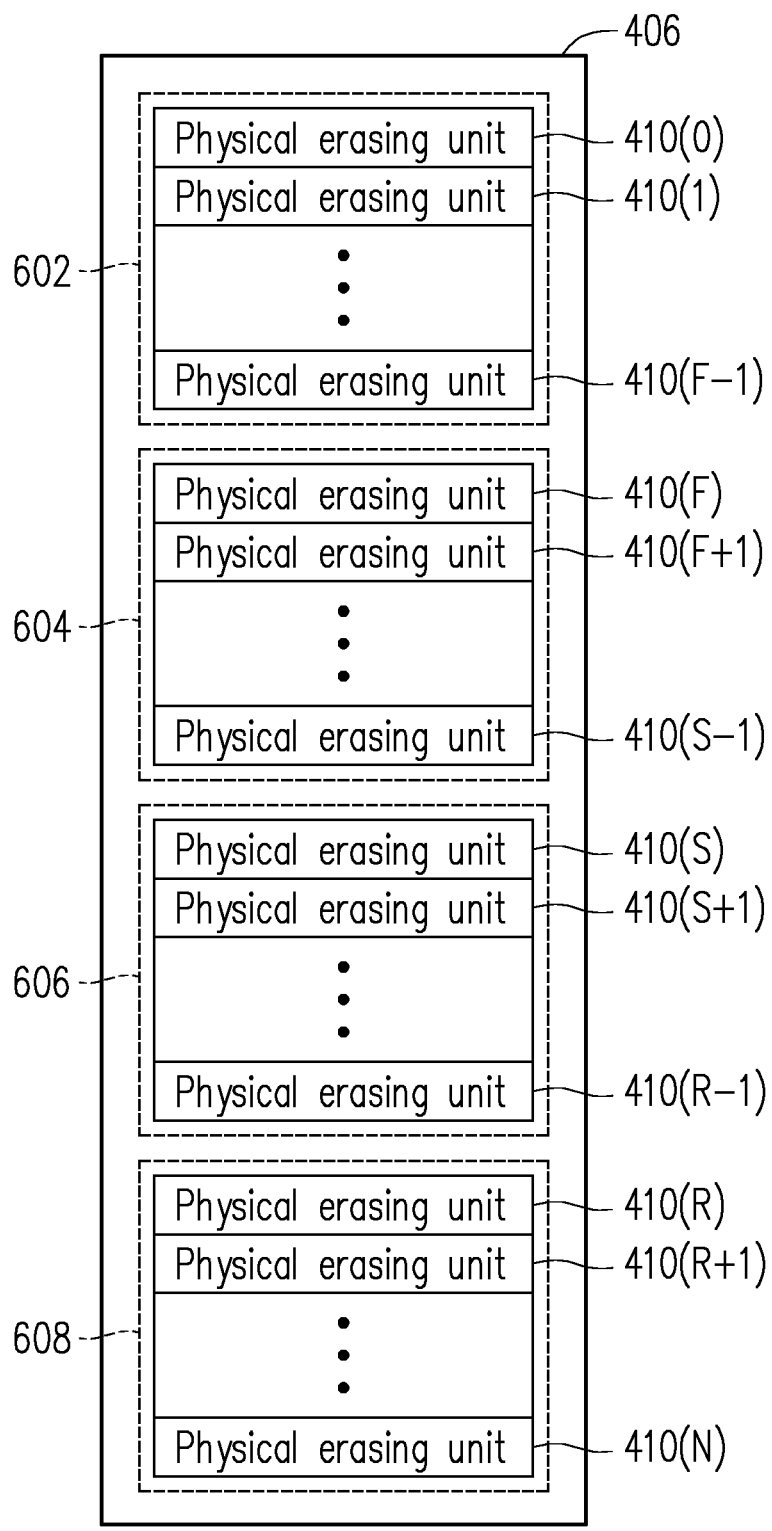
FIG. 7 and FIG. 8 are schematic diagrams showing an example of managing physical erasing units according to an exemplary embodiment of the disclosure.
Figure 8:
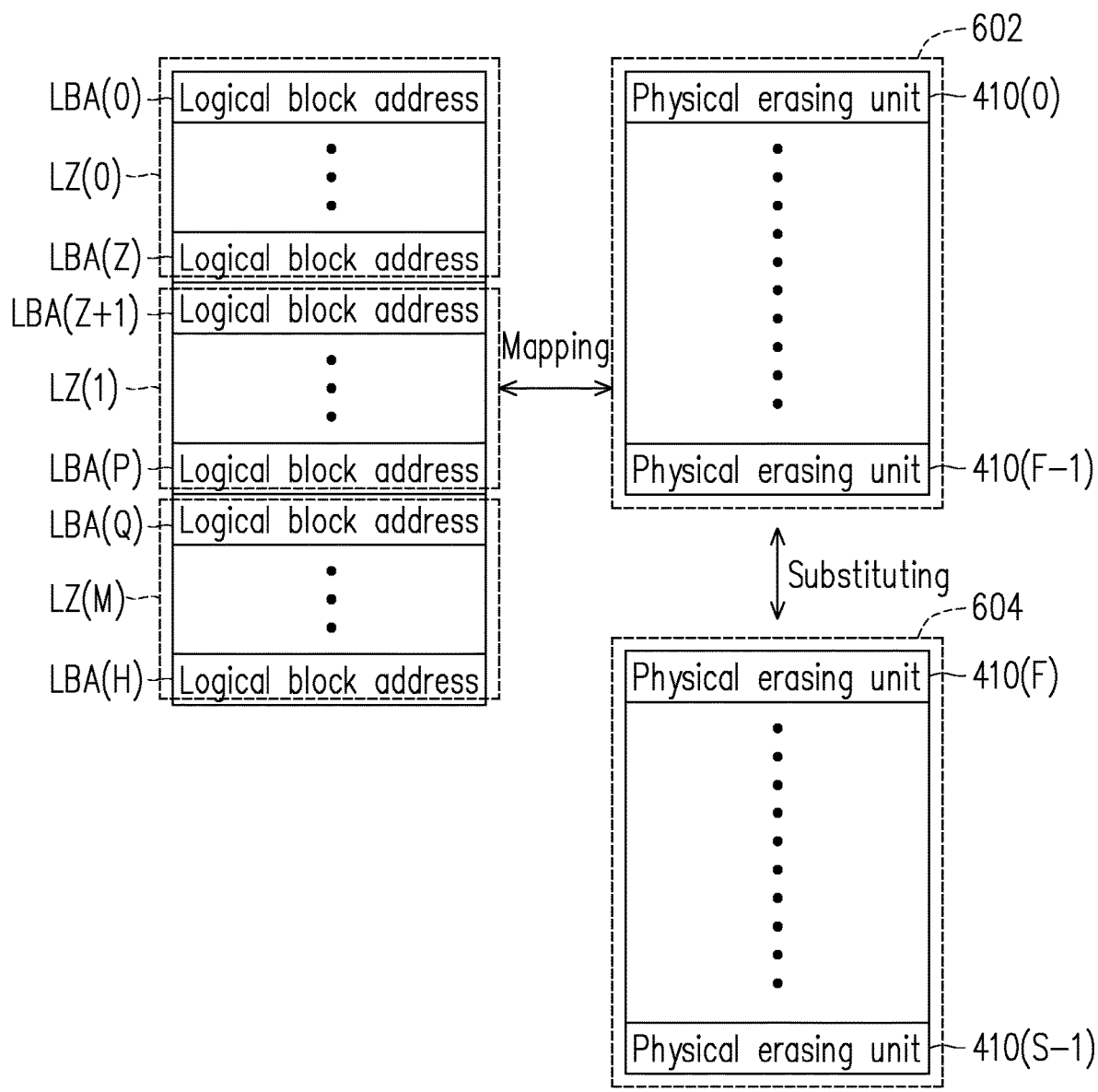

FIG. 7 and FIG. 8 are schematic diagrams showing an example of managing physical erasing units according to an exemplary embodiment of the disclosure.

It should be understood that herein, in the description of operations of the physical erasing units of the rewritable non-volatile memory module 406, the terms such as "get", "group", "divide", and "associate" describing the operations of the physical erasing units refer to logical concepts. In other words, the actual locations of the physical erasing units of the rewritable non-volatile memory module are not changed, but the physical erasing units of the rewritable non-volatile memory module are logically operated.

With reference to FIG. 7, the memory management circuit 502 logically groups the physical erasing units 410(0) to 410(N) into a data region 602, a spare region 604, a system region 606, and a replacement region 608.

The physical erasing units logically belonging to the data region 602 and the spare region 604 are configured to store data from the host system 11. Specifically, the physical erasing units of the data region 602 are regarded as the physical erasing units with data stored therein, and the physical erasing units of the spare region 604 is used to replace the physical erasing unit of the data region 602. In other words, when the memory management circuit 502 receives a write instruction and data to be written from the host system 11, the memory management circuit 502 writes data using the physical erasing unit gotten from the spare region 604 to replace the physical erasing unit of the data region 602.

The physical erasing units logically belonging to the system region 606 are configured to record system data. For example, the system data includes the manufacturer and model with regard to the rewritable non-volatile memory module, the number of physical erasing units of the rewritable non-volatile memory module, the number of physical programming units of each physical erasing unit, etc.

The physical erasing units logically belonging to the replacement region 608 are configured to replace damaged physical erasing units in a replacement program for damaged physical erasing units. Specifically, if there still exists a normal physical erasing unit in the replacement region 608 and a physical erasing unit of the data region 602 is damaged, the memory management circuit 502 gets the normal physical erasing unit from the replacement region 608 to replace the damaged physical erasing unit.

In particular, the numbers of physical erasing units in the data region 602, the spare region 604, the system region 606, and the replacement region 608 vary depending on different memory specifications. In addition, it should be understood that during operation of the memory storage device 10, the grouping relationship for associating the physical erasing units to the data region 602, the spare region 604, the system region 606, and the replacement region 608 is dynamically changed. For example, when the physical erasing unit in the spare region 604 is damaged and is replaced by the physical erasing unit in the replacement region 608, the physical erasing unit originally in the replacement region 608 is associated to the spare region 604.

With reference to FIG. 8, the memory management circuit 502 configures logical block addresses LBA(0) to LBA(H) to map the physical erasing units of the data region 602. Each logical block address has a plurality of logical addresses to map the physical programming units of the corresponding physical erasing unit. In addition, when the host system 11 is to write data into the logical address or update data stored in the logical addresses, the memory management circuit 502 gets a physical erasing unit from the spare region 604 as an active physical erasing unit to write data, substituting for the physical erasing unit of the data region 602. Moreover, when the physical erasing unit serving as the active physical erasing unit is filled, the memory management circuit 502 then gets an empty physical erasing unit from the spare region 604 as an active physical erasing unit to continue to write updated data corresponding to the write instruction from the host system 11. Furthermore, when the number of physical erasing units available in the spare region 604 is less than a predetermined value, the memory management circuit 502 performs a garbage collection operation (also referred to as a valid data merge operation) to organize valid data in the data region 602, and physical erasing units with no valid data stored therein of the data region 602 are re-associated to the spare region 604.

To identify in which physical programming unit the data of each logical address is stored, in this exemplary embodiment, the memory management circuit 502 records the mapping relationship between the logical addresses and the physical programming units. For example, in this exemplary embodiment, the memory management circuit 502 stores a logical-to-physical mapping table in the rewritable non-volatile memory module 406 to record the physical programming unit mapped by each logical address. When data is to be accessed, the memory management circuit 502 loads the logical-to-physical mapping table into the buffer memory 508 for maintenance, and writes or reads data according to the logical-to-physical mapping table. Notably, because of the limited capacity of the buffer memory 508, it is unable to store a mapping table that records the mapping relationship of all logical addresses. As a result, in this exemplary embodiment, the memory management circuit 502 groups the logical block addresses LBA(0) to LBA(H) into a plurality of logical regions LZ(0) to LZ(M), and configure one logical-to-physical mapping table for each logical region. In particular, when the memory management circuit 502 is to update mapping of a certain logical block address, the logical-to-physical mapping table corresponding to the logical region to which the logical block address belongs are loaded into the buffer memory 508 to be updated. Specifically, if the logical-to-physical mapping table corresponding to the logical region to which the logical block address belongs is not temporarily stored in the buffer memory 508 (i.e., when the logical-to-physical mapping table temporarily stored in the buffer memory 508 does not record the mapping of the logical block address to be updated), the memory management circuit 502 executes a mapping table swapping operation to store the logical-to-physical mapping table currently temporarily stored in the buffer memory 508 back into the rewritable non-volatile memory module 406, and loads the logical-to-physical mapping table that records the mapping of the logical block address to be updated into the buffer memory 508.

It should be noted that in an exemplary embodiment, the host system 11 may be capable of providing a host memory buffer (HMB) for the memory storage device 10, and the host memory buffer is configured to store the logical-to-physical mapping table. In this exemplary embodiment, the memory storage device 10 may be DRAM-less, and the host memory buffer provided by the host system 11 is in place of the buffer memory 508 to temporarily store the logical-to-physical mapping table.

In another exemplary embodiment of the disclosure, the control instructions of the memory management circuit 502 may also be stored in a specific area (e.g., a system region dedicated to storing system data in the memory module) of the rewritable non-volatile memory module 406 in the form of programming codes. In addition, the memory management circuit 502 is provided with a microprocessor unit (not shown), read only memory (not shown), and random access memory (not shown). In particular, there exists a boot code in the read only memory. When the memory control circuit unit 404 is enabled, the microprocessor unit first executes the boot code to load the control instructions stored in the rewritable non-volatile memory module 406 into the random access memory of the memory management circuit 502. After that, the microprocessor unit operates the control instructions to perform operations such as writing, reading, and erasing data.

In addition, in another example of the embodiment of the disclosure, the control instructions of the memory management circuit 502 may also be implemented in a hardware form. For example, the memory management circuit 502 includes a microcontroller, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller. The memory cell management circuit is configured to manage the physical erasing units of the rewritable non-volatile memory module 406. The memory write circuit is configured to issue a write instruction to the rewritable non-volatile memory module 406 to write data into the rewritable non-volatile memory module 406. The memory read circuit is configured to issue a read instruction to the rewritable non-volatile memory module 406 to read data from the rewritable non-volatile memory module 406. The memory erase circuit is configured to issue an erase instruction to the rewritable non-volatile memory module 406 to erase data from the rewritable non-volatile memory module 406. The data processing circuit is configured to process data to be written into the rewritable non-volatile memory module 406 and data read from the rewritable non-volatile memory module 406.

With further reference to FIG. 6, the host interface 504 is coupled to the memory management circuit 502 and is configured to be coupled to the connection interface unit 402 to receive and identify the instructions and data transmitted by the host system 11. In other words, the instructions and data transmitted by the host system 11 are transmitted through the host interface 504 to the memory management circuit 502. In this exemplary embodiment, the host interface 504 is compatible with the SATA standard. However, it should be understood that the disclosure is not limited thereto. The host interface 504 may also be compatible with the PATA standard, IEEE 1394 standard, PCI Express standard, USB standard, UHS-I interface standard, UHS-II interface standard, SD standard, MS standard, MMC standard, CF standard, IDE standard or other suitable data transmission standards.

The memory interface 506 is coupled to the memory management circuit 502 and configured to access the rewritable non-volatile memory module 406. In other words, data to be written into the rewritable non-volatile memory module 406 is converted through the memory interface 506 into a format acceptable by the rewritable non-volatile memory module 406.

The buffer memory 508 is coupled to the memory management circuit 502 and configured to temporarily store temporary data and instructions from the host system 11 or data from the rewritable non-volatile memory module 406.

The power management circuit 510 is coupled to the memory management circuit 502 and configured to control the power of the memory storage device 10.

The error checking and correcting circuit 512 is coupled to the memory management circuit 502 and configured to perform error checking and correcting procedures to ensure data correctness. For example, when the memory management circuit 502 receives a write instruction from the host system 11, the error checking and correcting circuit 512 generates a corresponding error checking and correcting code (ECC code) for data corresponding to the write instruction. In addition, the memory management circuit 502 writes the data corresponding to the write instruction and the corresponding error checking and correcting code into the rewritable non-volatile memory module 406. Later, while reading data from the rewritable non-volatile memory module 406, the memory management circuit 502 also reads the error checking and correcting code corresponding to the data. Moreover, the error checking and correcting circuit 512 performs error checking and correcting procedures on the read data according to the error checking and correcting code.

It is worth mentioning that in this exemplary embodiment, the memory management circuit 502 may program data to the rewritable non-volatile memory module 406 using different programming modes. For example, the memory management circuit 502 may program data into the physical erasing unit using a single-page programming mode or a multi-page programming mode. Herein, the programming speed of programming the memory cell based on the single-page programming mode is greater than the programming speed of programming the memory cell based on the multi-page programming mode (i.e., the operation time required to program data using the multi-page programming mode is greater than the operation time required to program data using the single-page programming mode), and the reliability of data stored based on the single-page programming mode tends to be higher than the reliability of data stored based on the multi-page programming mode.

The single-page programming mode is, for example, one of a single-level memory cell (SLC) programming mode, a lower physical programming mode, a mixture programming mode, and a less-level memory cell programming mode. To be more specific, in the single-level memory cell mode, one memory cell only stores one bit of data. In the lower physical programming mode, only the lower physical programming unit is programmed, and the upper physical programming unit corresponding to the lower physical programming unit may not be programmed. In the mixture programming mode, valid data (or real data) is programmed into the lower physical programming unit, while dummy data is programmed into the upper physical programming unit corresponding to the lower physical programming unit storing the valid data. In the less-level memory cell mode, one memory cell stores a first number of bits of data. For example, the first number may be set to "1".

The multi-page programming mode is, for example, a multi-level memory cell (MLC) programming mode, a third-level (TLC) memory cell programming mode, or similar modes. In the multi-page programming mode, one memory cell stores a second number of bits of data, and the second number is equal to or greater than "2". For example, the second number may be set to 2 or 3. For example, when data is written using the third-level (TLC) memory cell programming mode, the memory management circuit 502 programs the lower physical programming unit, the middle physical programming unit, and the upper physical programming unit of a physical programming unit group.

In other words, the number (i.e., a first number) of bits of data stored in each of the memory cells that form a first-type physical erasing unit after programmed using the single-page programming mode is less than the number (i.e., a second number) of bits of data stored in each of the memory cells that form a second-type physical erasing unit after programmed using the multi-page programming mode. Based on the above, the number of bits of data stored in the memory cell programmed using the multi-page programming mode is greater than the number of bits of data stored in the memory cell programmed using the single-page programming mode. Therefore, the data capacity of the physical erasing unit programmed using the multi-page programming mode is greater than that using the single-page programming mode.

In an exemplary embodiment, when the memory storage device 10 is powered-on, the memory management circuit 502 determines whether a power loss state of the memory storage device 10 matches an unexpected power loss state according to a power-off instruction. For example, the memory management circuit 502 may determine whether a normal power loss or an unexpected power loss occurs during the power loss of the memory storage device 10 according to the power-off instruction, and record occurrence of the normal power loss or the unexpected power loss to generate power loss information. In this exemplary embodiment, during the normal power loss of the system, the memory storage device 10 receives the power-off instruction from the host system 11. Herein, when the memory storage device 10 is powered-on after the power loss, if the memory management circuit 502 does not detect the power-off instruction, it may be determined that an unexpected power loss of the memory storage device 10 occurs during the power loss. When the memory storage device 10 is powered-on after the power loss, if the memory management circuit 502 detects the power-off instruction, it may be determined that a normal power loss of the memory storage device 10 occurs during the power loss. In this case, the memory management circuit 502 records information about occurrence of the normal power loss and/or the unexpected power loss and generates the power loss information, and determines whether the power loss state of the memory storage device 10 matches the unexpected power loss state according to the power loss information. The power loss information may reflect a frequency or relative count of occurrences of the unexpected power loss during multiple occurrences of power loss.

Specifically, the power loss information recorded by the memory management circuit 502 may include the time of occurrence of the power loss of the memory storage device 10, and a count of occurrences of the power loss of the memory storage device 10, which is not herein limited by the disclosure. The time of occurrence of the power loss includes, for example, the time of occurrence of the normal power loss and the time of occurrence of the unexpected power loss. The count of occurrences of the power loss includes, for example, a count of occurrences of the normal power loss and a count of occurrences of the unexpected power loss.

In an exemplary embodiment, if a count of consecutive occurrences of the unexpected power loss of the memory storage device 10 during a predetermined time period is greater than a predetermined count threshold value (also referred to as a first threshold value), the memory management circuit 502 determines that the unexpected power loss state is matched.

In another exemplary embodiment, if a ratio of the count of occurrences of unexpected power loss to the count of occurrences of the power loss of the memory storage device 10 is greater than a predetermined ratio threshold value (also referred to as a second threshold value), the memory management circuit 502 determines that the unexpected power loss state is matched.

In still another exemplary embodiment, if the unexpected power loss of the memory storage device 10 consecutively occurs a predetermined number of times, and an interval time between two consecutive unexpected power losses is less than a predetermined time threshold value (also referred to as a third threshold value), the memory management circuit 502 determines that the unexpected power loss state is matched.

In the above exemplary embodiments, the predetermined time period, the predetermined count threshold value, the predetermined ratio threshold value, the predetermined number of times, and the predetermined time threshold value, among other information, may be generated by professionals through a series of pilot tests and analyses, and may be saved in the rewritable non-volatile memory module 406, which is not herein limited by the disclosure.

When the memory management circuit 502 determines that the power loss state of the memory storage device 10 matches the unexpected power loss state, the memory management circuit 502 writes data into the physical programming units using the single-page programming mode and not using the multi-page programming mode. On the other hand, when the memory management circuit 502 determines that the power loss state of the memory storage device 10 does not match the unexpected power loss state, the memory management circuit 502 may write data into the physical programming units using the single-page programming mode or the multi-page programming mode.

In an exemplary embodiment, if it is determined that the power loss state of the memory storage device 10 matches the unexpected power loss state, the memory management circuit 502 also determines whether the power-off instruction was detected during a previous power loss of the memory storage device 10. If the power-off instruction is not detected, it may be determined that an unexpected power loss of the memory storage device 10 has occurred during the previous power loss. In this case, the memory management circuit 502 performs a sudden power-off recovery (SPOR) operation. During the sudden power-off recovery operation, data (also referred to as first data) stored in the physical erasing unit (also referred to as a first physical erasing unit) last written before the unexpected power loss has occurred is copied into another physical erasing unit (also referred to as a second physical erasing unit) using the single-page programming mode. In addition, when performing the sudden power-off recovery operation, the memory management circuit 502 may re-establish/update mapping information between the logical address corresponding to the first data and the physical programming unit included in the second physical erasing unit in the logical-to-physical mapping table to reflect that the first data has been copied (moved) to the second physical erasing unit for storage. However, the above-mentioned technical concept related to re-establishing/updating the logical-to-physical mapping table is technical means well known to those skilled in the art, and will not be repeatedly described herein.

In an exemplary embodiment, when detecting that the memory storage device 10 is powered-on and the power loss state matches the unexpected power loss state, the memory management circuit 502 receives an instruction (also referred to as a first instruction) from the host system 11. The first instruction may include a write instruction or another instruction that instructs the memory management circuit 502 to write data. After receiving the first instruction, the memory management circuit 502 writes data corresponding to the first instruction into the physical programming unit using the single-page programming mode.

Figure 9:
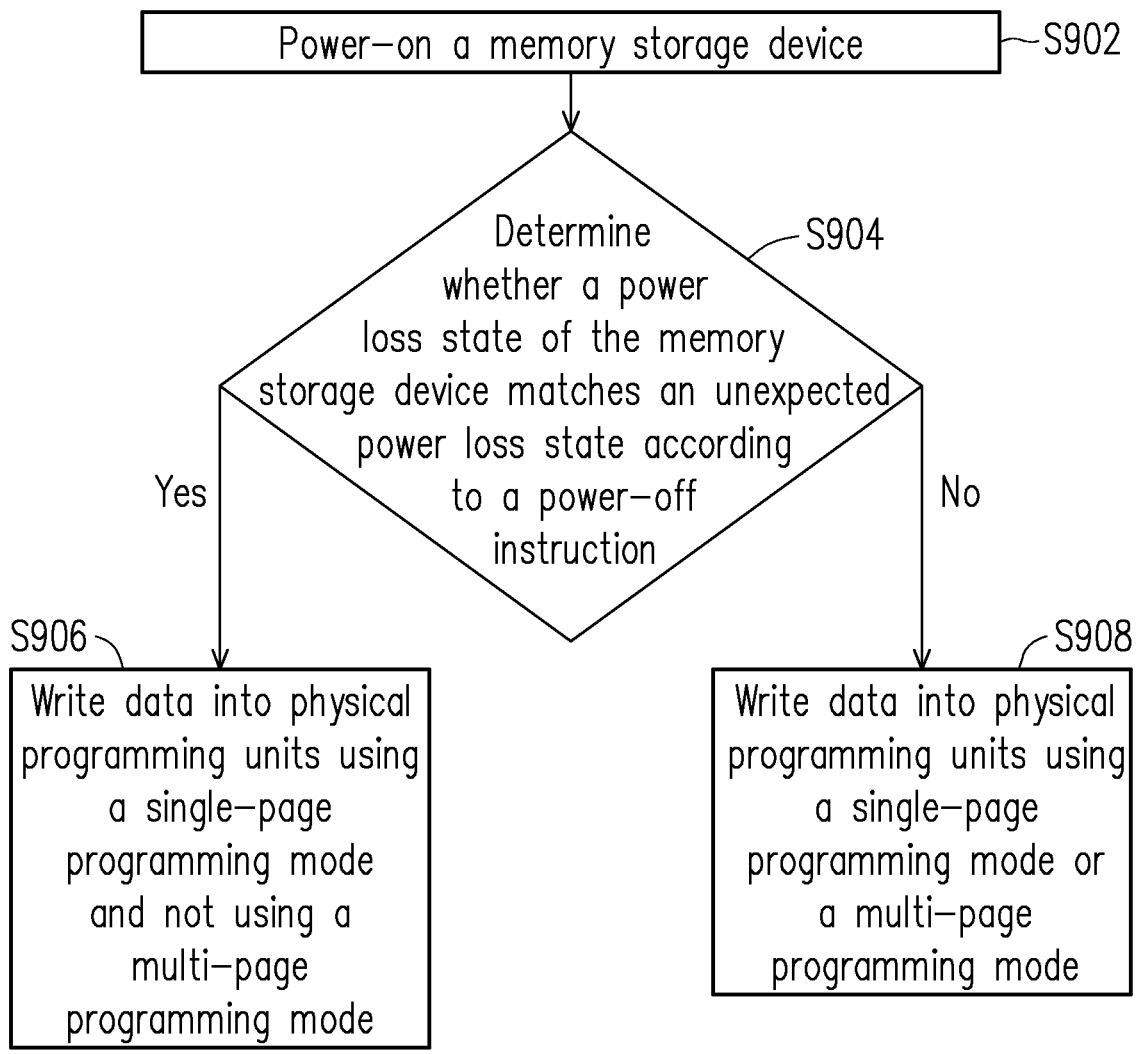
FIG. 9 is a flowchart of a data storing method according to an exemplary embodiment of the disclosure.

FIG. 9 is a flowchart of a data storing method according to an exemplary embodiment of the disclosure.

With reference to FIG. 9, in step S902, a memory storage device is powered-on. In step S904, it is determined whether a power loss state of the memory storage device matches an unexpected power loss state according to a power-off instruction. If it is determined that the unexpected power loss state is matched (i.e., "Yes" determined in step S904), in step S906, data is written into a physical programming unit using a single-page programming mode and not using a multi-page programming mode. If it is determined that the unexpected power loss state is not matched (i.e., "No" determined in step S904), in step S908, data is written into the physical programming unit using a single-page programming mode or a multi-page programming mode.

Nonetheless, each step in FIG. 9 has been described in detail as above, and will not be repeatedly described herein. Notably, each step in FIG. 9 may be implemented as multiple programming codes or circuits, which is not limited by the disclosure. In addition, the method of FIG. 9 may be used in conjunction with the above exemplary embodiments or may be used alone, which is not limited by the disclosure.

In summary of the foregoing, in the data storing method, the memory control circuit unit, and the memory storage device provided by the embodiments of the disclosure, when it is detected that the unexpected power loss state is matched, data may be written using the single-page programming mode. In addition, according to the embodiments of the disclosure, when the previous power loss was an unexpected power loss, data may be copied using the single-page programming mode and a logical-to-physical mapping table may be re-established/updated. In this way, time of performing the sudden power-off recovery operation is reduced. Based on the above, the recovery time from an unexpected power loss is reduced, and operating efficiency of the memory storage device is increased.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A data storing method for a memory storage device, the memory storage device comprising a rewritable non-volatile memory module, wherein the rewritable non-volatile memory module comprises a plurality of physical erasing units, each of the plurality of physical erasing units has a plurality of physical programming units, the plurality of physical programming units are mapped to a plurality of logical addresses, and the data storing method comprises:

determining whether a power loss state of the memory storage device matches an unexpected power loss state according to a power-off instruction when the memory storage device is powered-on; and writing data into the plurality of physical programming units using a single-page programming mode and not using a multi-page programming mode when it is determined that the power loss state matches the unexpected power loss state, wherein the step of writing the data into the plurality of physical programming units using the single-page programming mode and not using the multi-page programming mode comprises:

receiving a first instruction from a host system; and writing data corresponding to the first instruction into the plurality of physical programming units using the single-page programming mode.

2. The data storing method according to claim 1, wherein the step of determining whether the power loss state of the memory storage device matches the unexpected power loss state according to the power-off instruction comprises:

determining whether a normal power loss or an unexpected power loss occurs during a power loss according to the power-off instruction, and recording occurrence of the normal power loss or occurrence of the unexpected power loss to generate power loss information, wherein it is determined that the unexpected power loss occurs during the power loss if the power-off instruction is not detected during powering-on after the power loss, and wherein it is determined that the normal power loss occurs during the power loss if the power-off instruction is detected during powering-on after the power loss; and determining whether the power loss state matches the unexpected power loss state according to the power loss information.

3. The data storing method according to claim 2, wherein the step of determining whether the power loss state of the memory storage device matches the unexpected power loss state according to the power loss information comprises:

determining that the power loss state matches the unexpected power loss state if a count of consecutive occurrences of the unexpected power loss during a predetermined time period is greater than a first threshold value.

4. The data storing method according to claim 2, wherein the step of determining whether the power loss state of the memory storage device matches the unexpected power loss state according to the power loss information comprises:

determining that the power loss state matches the unexpected power loss state if a ratio of a count of occurrences of the unexpected power loss to a count of occurrences of the power loss is greater than a second threshold value.

5. The data storing method according to claim 2, wherein the step of determining whether the power loss state of the memory storage device matches the unexpected power loss state according to the power loss information comprises:

determining that the power loss state matches the unexpected power loss state if the unexpected power loss consecutively occurs a predetermined number of times and an interval time between two consecutive occurrences of the unexpected power loss is less than a third threshold value.

6. The data storing method according to claim 1, wherein the step of writing the data into the plurality of physical programming units using the single-page programming mode and not using the multi-page programming mode when it is determined that the power loss state matches the unexpected power loss state comprises:

determining whether the power-off instruction was detected during a previous power loss; and determining that an unexpected power loss has occurred during the previous power loss and performing a sudden power-off recovery operation if the power-off instruction is not detected, wherein the sudden power-off recovery operation comprises:

copying first data stored in a first physical erasing unit into a second physical erasing unit using the single-page programming mode, wherein the first physical erasing unit is the physical erasing unit last written before the unexpected power loss occurs; and updating mapping information between a logical address corresponding to the first data and the physical programming unit comprised in the second physical erasing unit in a logical-to-physical mapping table.

7. A memory control circuit unit for controlling a memory storage device, wherein the memory storage device comprises a rewritable non-volatile memory module, and the memory control circuit unit comprises:

a host interface configured to be coupled to a host system;

a memory interface configured to be coupled to the rewritable non-volatile memory module, wherein the rewritable non-volatile memory module comprises a plurality of physical erasing units, each of the plurality of physical erasing units has a plurality of physical programming units, and the plurality of physical programming units are mapped to a plurality of logical addresses; and a memory management circuit coupled to the host interface and the memory interface, wherein the memory management circuit is configured to perform a first operation of determining whether a power loss state of the memory storage device matches an unexpected power loss state according to a power-off instruction when the memory storage device is powered-on, and the memory management circuit is further configured to perform an operation of writing data into the plurality of physical programming units using a single-page programming mode and not using a multi-page programming mode when it is determined that the power loss state matches the unexpected power loss state, wherein the operation of writing the data into the plurality of physical programming units using the single-page programming mode and not using the multi-page programming mode comprises:

receiving a first instruction from the host system; and writing data corresponding to the first instruction into the plurality of physical programming units using the single-page programming mode.

8. The memory control circuit unit according to claim 7, wherein the first operation of determining whether the power loss state of the memory storage device matches the unexpected power loss state according to the power-off instruction comprises:

determining whether a normal power loss or an unexpected power loss occurs during a power loss according to the power-off instruction, and recording an occurrence of the normal power loss or an occurrence of the unexpected power loss to generate power loss information, wherein it is determined that the unexpected power loss occurs during the power loss if the power-off instruction is not detected during powering-on after the power loss, and wherein it is determined that the normal power loss occurs during the power loss if the power-off instruction is detected during powering-on after the power loss; and performing a second operation of determining whether the power loss state matches the unexpected power loss state according to the power loss information.

9. The memory control circuit unit according to claim 8, wherein the second operation of determining whether the power loss state of the memory storage device matches the unexpected power loss state according to the power loss information comprises:

determining that the power loss state matches the unexpected power loss state if a count of consecutive occurrences of the unexpected power loss during a predetermined time period is greater than a first threshold value.

10. The memory control circuit unit according to claim 8, wherein the second operation of determining whether the power loss state of the memory storage device matches the unexpected power loss state according to the power loss information comprises:

determining that the power loss state matches the unexpected power loss state if a ratio of a count of occurrences of the unexpected power loss to a count of occurrences of the power loss is greater than a second threshold value.

11. The memory control circuit unit according to claim 8, wherein the second operation of determining whether the power loss state of the memory storage device matches the unexpected power loss state according to the power loss information comprises:

determining that the power loss state matches the unexpected power loss state if the unexpected power loss consecutively occurs a predetermined number of times and an interval time between two consecutive occurrences of the unexpected power loss is less than a third threshold value.

12. The memory control circuit unit according to claim 7, wherein the operation of writing the data into the plurality of physical programming units using the single-page programming mode and not using the multi-page programming mode when it is determined that the power loss state matches the unexpected power loss state comprises:

determining whether the power-off instruction was detected during a previous power loss; and determining that an unexpected power loss has occurred during the previous power loss and performing a sudden power-off recovery operation if the power-off instruction is not detected, wherein the sudden power-off recovery operation comprises:

copying first data stored in a first physical erasing unit into a second physical erasing unit using the single-page programming mode, wherein the first physical erasing unit is the physical erasing unit last written before the unexpected power loss occurs; and updating mapping information between a logical address corresponding to the first data and the physical programming unit comprised in the second physical erasing unit in a logical-to-physical mapping table.

13. A memory storage device, comprising:

a connection interface unit configured to be coupled to a host system;

a rewritable non-volatile memory module; and a memory control circuit unit coupled to the connection interface unit and the rewritable non-volatile memory module, wherein the rewritable non-volatile memory module comprises a plurality of physical erasing units, each of the plurality of physical erasing units has a plurality of physical programming units, and the plurality of physical programming units are mapped to a plurality of logical addresses, wherein the memory control circuit unit is configured to perform a first operation of determining whether a power loss state of the memory storage device matches an unexpected power loss state according to a power-off instruction when the memory storage device is powered-on, and the memory control circuit unit is further configured to perform an operation of writing data into the plurality of physical programming units using a single-page programming mode and not using a multi-page programming mode when it is determined that the power loss state matches the unexpected power loss state, wherein the operation of writing the data into the plurality of physical programming units using the single-page programming mode and not using the multi-page programming mode comprises:

receiving a first instruction from the host system; and writing data corresponding to the first instruction into the plurality of physical programming units using the single-page programming mode.

14. The memory storage device according to claim 13, wherein the first operation of determining whether the power loss state of the memory storage device matches the unexpected power loss state according to the power-off instruction comprises:

determining whether a normal power loss or an unexpected power loss occurs during a power loss according to the power-off instruction, and recording an occurrence of the normal power loss or an occurrence of the unexpected power loss to generate power loss information, wherein it is determined that the unexpected power loss occurs during the power loss if the power-off instruction is not detected during powering-on after the power loss, and wherein it is determined that the normal power loss occurs during the power loss if the power-off instruction is detected during powering-on after the power loss; and performing a second operation of determining whether the power loss state matches the unexpected power loss state according to the power loss information.

15. The memory storage device according to claim 14, wherein the second operation of determining whether the power loss state of the memory storage device matches the unexpected power loss state according to the power loss information comprises:

determining that the power loss state matches the unexpected power loss state if a count of consecutive occurrences of the unexpected power loss during a predetermined time period is greater than a first threshold value.

16. The memory storage device according to claim 14, wherein the second operation of determining whether the power loss state of the memory storage device matches the unexpected power loss state according to the power loss information comprises:

determining that the power loss state matches the unexpected power loss state if a ratio of a count of occurrences of the unexpected power loss to a count of occurrences of the power loss is greater than a second threshold value.

17. The memory storage device according to claim 14, wherein the second operation of determining whether the power loss state of the memory storage device matches the unexpected power loss state according to the power loss information comprises:

determining that the power loss state matches the unexpected power loss state if the unexpected power loss consecutively occurs a predetermined number of times and an interval time between two consecutive occurrences of the unexpected power loss is less than a third threshold value.

18. The memory storage device according to claim 13, wherein the operation of writing the data into the plurality of physical programming units using the single-page programming mode and not using the multi-page programming mode when it is determined that the power loss state matches the unexpected power loss state comprises:

determining whether the power-off instruction was detected during a previous power loss; and determining that an unexpected power loss has occurred during the previous power loss and performing a sudden power-off recovery operation if the power-off instruction is not detected, wherein the sudden power-off recovery operation comprises:

copying first data stored in a first physical erasing unit into a second physical erasing unit using the single-page programming mode, wherein the first physical erasing unit is the physical erasing unit last written before the unexpected power loss occurs; and updating mapping information between a logical address corresponding to the first data and the physical programming unit comprised in the second physical erasing unit in a logical-to-physical mapping table.

\* \* \* \* \*